Aug. 10, 1926.  
O. E. BORTON  
1,595,446  
WOOD SAWING ATTACHMENT FOR MOTOR DRIVEN VEHICLES  
Filed Dec. 17, 1925  2 Sheets-Sheet 1
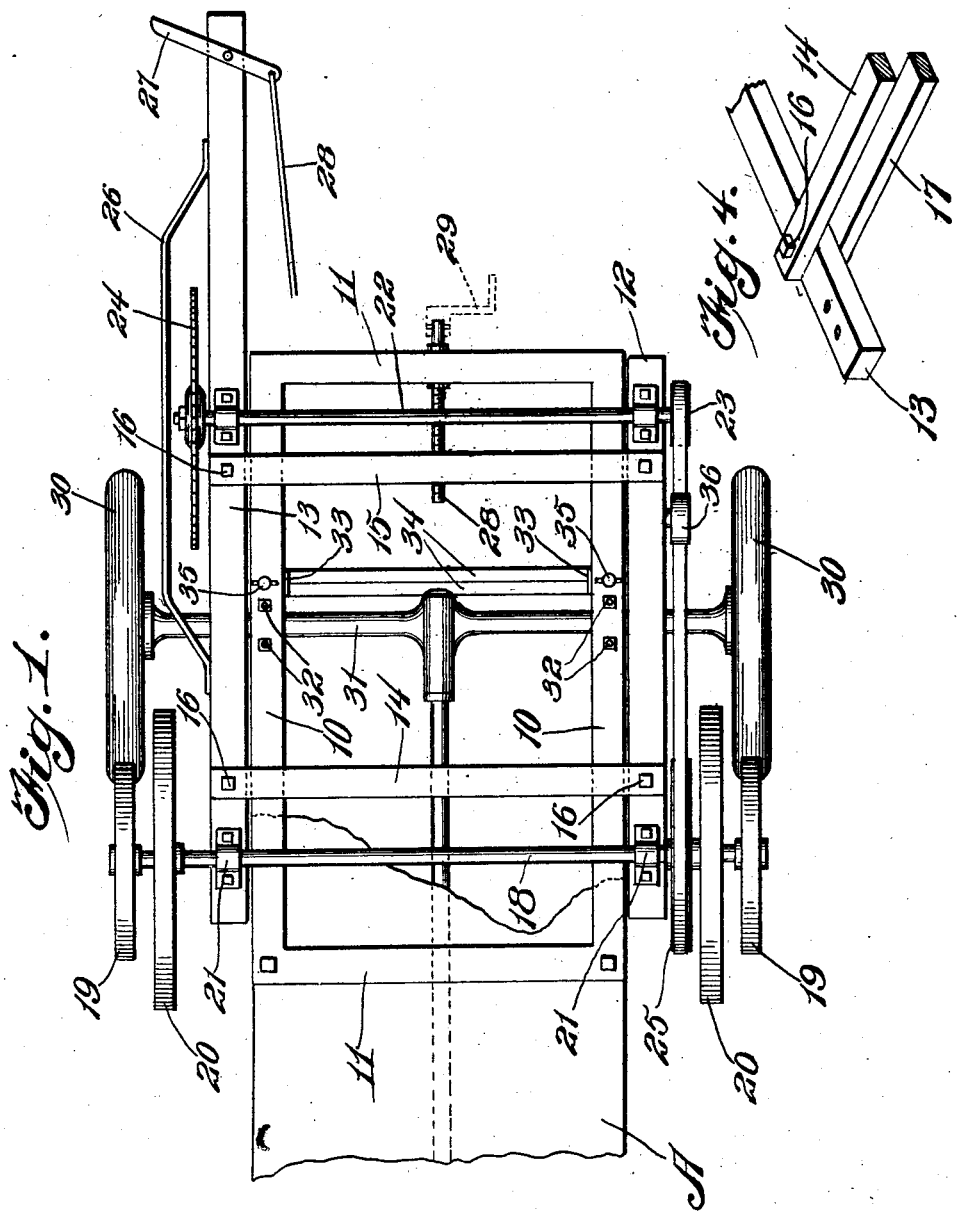
Inventor  
Omia E. Borton  
By Watson E. Coleman  
Attorney Aug. 10, 1926.
O. E. BORTON
1,595,446
WOOD SAWING ATTACHMENT FOR MOTOR DRIVEN VEHICLES
Filed Dec. 17, 1925    2 Sheets-Sheet 2
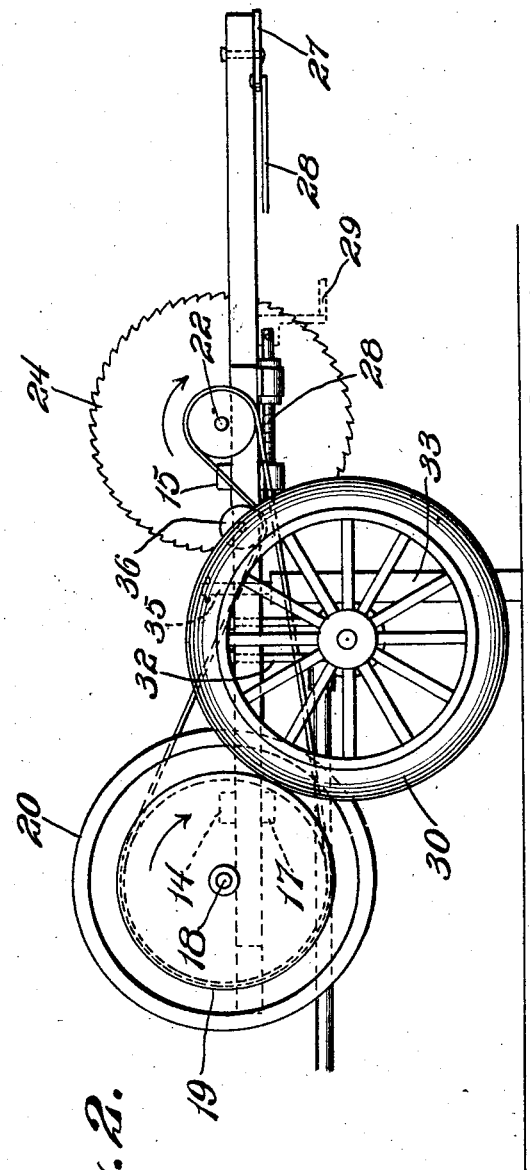
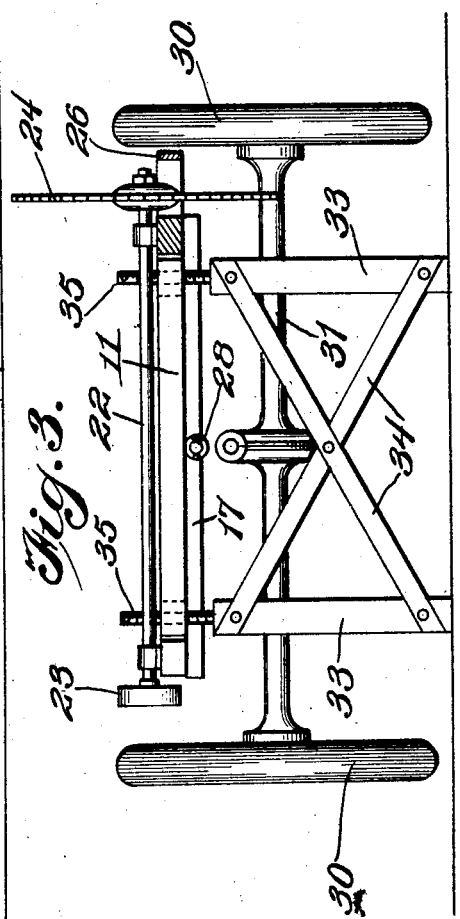
Inventor
Omia E. Borton
By Watson E. Coleman
Attorney Patented Aug. 10, 1926.

1,595,446

UNITED STATES PATENT OFFICE.

OMIA EARL BORTON, OF AVA, MISSOURI.

WOOD-SAWING ATTACHMENT FOR MOTOR-DRIVEN VEHICLES.

Application filed December 17, 1925. Serial No. 76,055.

This invention relates to wood sawing attachments for automobiles, trucks and Ford roadsters and vehicles of like description and one of the objects of the invention is to provide an attachment of this character which may be readily attached to practically all makes of cars or trucks and which requires practically no change in the vehicle but merely the removal of certain parts as for instance, the "turtle back" on a Ford roadster.

A further object is to provide a mechanism of this character so designed that the saw mandrel is driven from the driving wheels of the car, the car being jacked up at its rear end for this purpose.

A still further object is to provide means whereby vibration of the driving wheels of the car and of the chassis independently of the saw attachment is prevented and whereby the friction wheels which are designed to operate the saw mandrel may be held in close frictional engagement with the driving wheels of the car.

A further object is to provide means whereby the rear end of the car may be jacked up and the sawing attachment be supported firmly in place.

My invention is illustrated in the accompanying drawings:—

Figure 1 is a top plan view of a wood sawing attachment constructed in accordance with my invention;

Fig. 2 is a side elevation thereof;

Fig. 3 is an end elevation of the attachment and showing the axle of the car in its raised position;

Fig. 4 is a fragmentary perspective view of one corner of the frame formed by the members 13—14 and 17.

Referring to the drawings it will be seen that I have illustrated my attachment as applied to the rear end of a Ford roadster or like car and that the attachment comprises a main frame consisting of the longitudinal beams 10 and the transverse connecting beams 11, these beams being framed together in any suitable manner and being bolted to the car. The longitudinal beams 10 extend over the car back of the seat thereof, outward about 19 inches past the rear axle of the car and they are fastened to the body of the car by bolts, one at each corner of the platform back of the seat. Thus I provide a stationary frame which is securely fastened to the body of the roadster.

Operating in conjunction with the stationary frame formed by the members 10 and 11 is a sliding frame consisting of the parallel beams 12 and 13, the beam 13 being longer than the beam 12. These beams 12 and 13 are disposed in sliding contact with the lateral faces of the beams 10 and these beams 12 and 13 are connected by means of a transverse beam 14 disposed rearward of the forward ends of the beams 10, extending over these beams and by a transverse beam 15 which is attached to the rear ends of the beams 12 and 13 and also rests upon the frame formed by the beams 10. Thus the frame formed by the beams 12 and 13 and 14 and 15 can readily slide upon the beams 10 passing through the cross beam 14 and through the beams 12 and 13 are clamped bolts 16 which pass through a transversely extending beam 17 disposed immediately below the beam 14 and urging against the end side of the beams 10. When the sliding frame has been adjusted along the beams 10 until the friction wheels, to be hereafter described, are in engagement with the wheels of the car, then these bolts 16 are tightened, clamping the adjustable or sliding frame upon the fixed frame and when it is desired to adjust this sliding frame these bolts are loosened for the purpose. Mounted upon the sliding frame is a transverse shaft 18 which carries upon its ends the friction wheels 19, and inward of these friction wheels are the fly wheels 20. This shaft 18 is mounted in suitable bearings 21 on the sliding frame. Mounted upon the sliding frame adjacent the rear end thereof is a saw mandrel 22 mounted in suitable bearings and carrying at one end the band wheel 23 and its opposite end the saw 24. This band wheel 23 is driven from a relatively large band wheel 25 mounted upon the shaft 18 by means of a belt or sprocket chain.

On the relatively long beam 13 is the supporting iron 26 which extends parallel to but is spaced from the saw 24 and has its ends turned in and attached to the beam 13 in any suitable manner. This supporting iron 26 and the adjacent portion of the beam 13 together constitute a saw table upon which the article to be sawed may be placed and fed to the saw. Also mounted upon the beam 13 rearward of the iron 26 is a gas controlling lever 27 which is connected by a chain, wire or other link 28 to the carbureter of the motor so as to control the same and have this control convenient to the operator.

For the purpose of shifting the sliding frame formed by the members 12, 13, 14 and 15 longitudinally upon the fixed frame I provide a screw 28 which is engaged in one of the end beams 11 and has screw threaded operative engagement with the beam 15 as for instance, by means of a fixed nut carried by the said beam. A crank handle 29 is attached to this screw 28 whereby it may be turned, this crank handle being removable. By rotating this screw 28 the sliding frame may be shifted to bring the friction wheels 19 into proper frictional engagement with the drive wheels 30 of the car, these drive wheels being mounted upon the usual axle disposed within the housing 31. U-bolts 32 surround this axle housing and extend up over the beams 10. For the purpose of raising or lowering the rear end of the automobile or truck and the rear end of the sawing attachment, I provide a stationary frame consisting of two uprights 33 and the cross braces 34 and passing through the beams 10 are the jack screws 35 which bear upon the upper face of the uprights 33 and which at their upper ends are so formed as to be engaged by the crank 29. Thus it will be seen that when it is desired to elevate the chassis and the sawing attachment, the frame formed by the uprights 33 and the braces 34 is inserted beneath the saw frame and engaged by the screws 35 and then these screws are turned to lift up on the rear end of the frame.

Preferably a belt tightening wheel 36 is mounted upon one of the beams 12 and over which a belt transmitting motion from wheel 25 to 23 passes.

The use of this device will be obvious from what has gone before. When it is desired to use the saw attachment the rear end of the chassis is elevated by means of the frame formed by the members 33 and 34 and the screws 35. The sliding frame is then adjusted by the screw 28 so as to bring the frictional wheels 19 in proper engagement with the drive wheels 30. The screw 28 will hold the sliding frame in its adjusted position. Power is then transmitted from the drive wheels to the saw mandrel and sawing is accomplished in the usual manner.

While I have illustrated certain details of construction and arrangement of parts I do not wish to be limited to these as it is obvious that many changes might be made in these parts without departing from the spirit of the invention as defined in the appended claims.

I claim:—

1. The combination with a motor driven vehicle, of a frame fixedly mounted upon the rear end of the vehicle, a sliding frame mounted upon the fixed frame, a shaft carried by the sliding frame and carrying friction wheels, means whereby the sliding frame may be shifted to engage the friction wheels with the drive wheels of the vehicle, a saw mandrel mounted upon the sliding frame and means for driving the saw mandrel from said shaft.

2. The combination with a motor operated vehicle having driving wheels, of a frame fixed thereto at the rear end thereof, a sliding frame mounted upon the fixed frame, means at the rear end of the fixed frame whereby the sliding frame may be shifted longitudinally and held in this shifted position, means whereby the sliding frame may be clamped to the fixed frame when the sliding frame has been adjusted, a transverse shaft on the sliding frame, friction wheels carried thereon and adapted to engage the driving wheels of the machine and to be driven thereby, a saw mandrel mounted upon the sliding frame and means for transmitting motion from the shaft to said saw mandrel.

3. The combination with a motor driven vehicle, of a sawing attachment therefor, comprising a frame fixed to the vehicle, a sliding frame mounted upon the fixed frame for longitudinal adjustment, means for adjusting the sliding frame, and longitudinal means for clamping the sliding frame in this adjusted position and to the fixed frame, a saw mandrel mounted upon the sliding frame and having a saw at one end and a band wheel at the other, a shaft mounted upon the sliding frame at the other end thereof and carrying friction wheels and a band wheel, the friction wheels being adapted to engage with the driving wheels of the vehicle, and means for operatively connecting the band wheel on the shaft with the band wheel on the saw mandrel.

4. The combination with a motor driven vehicle, of a sawing attachment therefor, comprising a frame fixed to the vehicle, a sliding frame mounted upon the fixed frame for longitudinal adjustment, means for adjusting the sliding frame and means for clamping the sliding frame in this position and to the fixed frame, a saw mandrel mounted upon the sliding frame and having a saw at one end and a band wheel at the other, a shaft mounted upon the sliding frame at the other end thereof and carrying friction wheels and a band wheel, the friction wheels being adapted to engage with the driving wheels of the vehicle, and means for operatively connecting the band wheel on the shaft with the band wheel on the saw mandrel.

5. A sawing attachment for motor driven vehicles comprising a frame adapted to be mounted upon the chassis of a vehicle and held rigidly thereto, a slidable frame coacting with the first named frame, means engaging both frames whereby the frame may be longitudinally shifted, means whereby both frames may be clamped in firm engagement with each other, a shaft mounted upon the forward end of the sliding frame and carrying friction wheels adapted to engage with the driving wheels of the motor car, a mandrel mounted upon the rear end of the sliding frame and carrying a saw, the sliding frame being formed with a work supporting portion, a member of which is disposed outward of the saw and rearward thereof, and means for transmitting motion from said shaft to the saw mandrel.

6. A sawing attachment for motor vehicles comprising a frame adapted to be fixed upon the chassis of a motor vehicle a sliding frame comprising longitudinally extending beams disposed on each side of the main frame and slidable longitudinally with relation thereto, cross beams connecting said last named beams and extending above and below the main frame, means for clamping certain of the cross beams against the beams of the main frame to thereby clamp the sliding frame in adjusted position, a screw engaging the main frame and one of the cross beams of the sliding frame whereby the sliding frame may be adjusted, a shaft mounted upon the sliding frame and carrying frictional wheels adapted to engage with the driving wheels of the vehicle, fly wheels mounted upon said shaft, a saw mandrel mounted upon the rear end of the sliding frame and carrying a saw at one end, and means affording a driving connection between the shaft and the saw mandrel, one of the beams of the sliding frame adjacent the saw being extended rearward beyond the saw guard attached to said last named beam and disposed parallel to but outward of the saw and extending rearward beyond the saw.

In testimony whereof I hereunto affix my signature.

OMIA EARL BORTON.